(12) United States Patent
Xu et al.

(10) Patent No.: US 8,660,723 B2
(45) Date of Patent: Feb. 25, 2014

(54) METHOD FOR DETERMINING RUN-CURVES FOR VEHICLES IN REAL-TIME SUBJECT TO DYNAMIC TRAVEL TIME AND SPEED LIMIT CONSTRAINT

(71) Applicant: Mitsubishi Electric Research Laboratories, Cambridge, MA (US)

(72) Inventors: Jingyang Xu, Malden, MA (US); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/680,232

(22) Filed: Nov. 19, 2012

(65) Prior Publication Data

US 2014/0005877 A1    Jan. 2, 2014

Related U.S. Application Data

(63) Continuation-in-part of application No. 13/538,794, filed on Jun. 29, 2012.

(51) Int. Cl.
*B61L 27/04*    (2006.01)
(52) U.S. Cl.
USPC .................... 701/20; 701/19; 246/182 R
(58) Field of Classification Search
USPC ............................... 701/19–20, 99
See application file for complete search history.

(56) References Cited

U.S. PATENT DOCUMENTS

| | | | | |
|---|---|---|---|---|
| 5,627,752 A * | 5/1997 | Buck et al. | | 701/36 |
| 2004/0059475 A1* | 3/2004 | Hawthorne | | 701/19 |
| 2007/0219681 A1* | 9/2007 | Kumar et al. | | 701/19 |
| 2007/0219683 A1* | 9/2007 | Daum et al. | | 701/19 |
| 2010/0174440 A1* | 7/2010 | Franchineau et al. | | 701/29 |
| 2010/0262321 A1* | 10/2010 | Daum et al. | | 701/20 |
| 2012/0277940 A1* | 11/2012 | Kumar et al. | | 701/20 |
| 2012/0323412 A1* | 12/2012 | Chandra et al. | | 701/19 |
| 2013/0131898 A1* | 5/2013 | Kumar et al. | | 701/20 |
| 2013/0151107 A1* | 6/2013 | Nikovski et al. | | 701/99 |

OTHER PUBLICATIONS

Ko, H., Koseki, T. and Miyatake, M., "Application of dynamic programming to optimization of running profile of a train", IEEJ Transactions on Industry Applications, vol. 125, Issue 12, pp. 1084-1092 (2006).

(Continued)

*Primary Examiner* — Khoi Tran
*Assistant Examiner* — Ryan Rink
(74) *Attorney, Agent, or Firm* — Dirk Brinkman; Gene Vinokur

(57) ABSTRACT

A method reduces the computational complexity for determining optimal run-curves for a specific travel time of a vehicle along a route between two locations, when travel time and speed limit requirements are subject to change. The determination is partitioned into preprocessing and real-time steps. A set of weights are generated, and run-curves for the weights are obtained and stored during the preprocessing. A state transition matrix is generated in the preprocessing step and updated partially in the real-time step only for a subspace of velocities and locations constrained by speed limits. The optimal weight for solving an objective function to obtain an optimal run-curve can be obtained by searching with an initial estimation of multiple weights, and interpolating from the relation between the travel time and the initial weights to obtain the optimal weight.

10 Claims, 5 Drawing Sheets

(56) References Cited

OTHER PUBLICATIONS

K.K. Wong and T.K. Ho, "Coast control for mass rapid transit railways with searching methods", IEE Proceedings—Electric Power Applications, vol. 151, issue3, May 2004, p. 365-376.

Y.V. Bocharnikov, A.M. Tobias, C. Roberts, S. Hillmansen and C.J. Goodman, "Optimal driving strategy for traction energy saving on DC suburban railways", IET Electric Power Applications, vol. 1, issue5, Sep. 2007, p. 675-682.

Y.V. Bocharnikov, A.M. Tobias, C. Roberts, "Reduction of Train and Net Energy Consumption Using Genetic Algorithms for Trajectory Optimisation", RTS 2010—Railway Traction Systems Apr. 13-15, 2010, Birmingham, UK.

Schank, T., "A Fast Algorithm for Computing the Running-Time of Trains by Infinitesimal Calculus", Railrome 2011, 4th International Seminar on Railway Operations Modeling and Analysis. Feb. 16-18, 2011, Sapienza—University of Rome.

D. Yong, L. Haidong, B Yun, Z Fangming, "A Two-level Optimization Model and Algorithm for Energy-Efficient Urban Train Operation", Journal of Transportation Systems Engineering and Information Technology, vol. 11, Issue 1, Feb. 2011 Online English edition of the Chinese language journal.

L. Liang, D. Wei, J. Yindong, Z. Zengke, "An Optimal Driving Strategy for High-Speed Electric Train", Proceedings of the 30th Chinese Control Conference, Jul. 22-24, 2011, Yantai, China.

* cited by examiner

METHOD FOR DETERMINING RUN-CURVES FOR VEHICLES IN REAL-TIME SUBJECT TO DYNAMIC TRAVEL TIME AND SPEED LIMIT CONSTRAINT

RELATED APPLICATION

This application is a continuation-in-part application of U.S. application Ser. No. 13/538,794 "Method for Determining Run-Curves for Vehicles Based on Travel Time," filed by Xu on Jun. 29, 2012 and incorporated herein by reference. The related application determines optimal run-curves in real-time.

FIELD OF THE INVENTION

This invention relates generally to run-curve optimization for vehicles, and more particularly to optimizing run-curves for trains subject to travel time and speed limit constraints while minimizing energy consumption by the trains.

BACKGROUND OF THE INVENTION

In a railway system, and especially in a high-density commuter or subway systems, trains run along a route according to a schedule that can have different travel times that arise from an overall schedule, which is usually managed by a control center. Speeds are constrained by planned and unplanned events, such as maintenance accidents, passenger density, weather, and the like. Thus, it is necessary to determine an optimal run-curve for the train according to dynamic travel time requirement and speed limit constraints. The run-curve profile can be optimized such that energy consumption is minimized, while simultaneously satisfying all constraints of Motion, such as speed limits, safety zones, and etc. Efficient run-curves for vehicles can reduce energy consumption.

In the railway system, the trains can be equipped with regenerative brakes, batteries, and other traction and energy transformation devices. A topology of the system is fixed. The topology reflects the lengths, run-curves, and slope of the various routes. A resistance from air and tracks can also be a function of the speed and location of the train along the route. At a large scale, the mass of the train is relatively constant.

The travel times, subject to preplanned schedules and dynamic events, often are unknown until just before departure, and in some cases, along the route. Thus, it is required to optimize the run-curves in real-time.

Dynamics of the vehicle can be described by $$\frac{dv}{dt} = a[z(t), v(t), u(t)], \quad (1)$$

$$\frac{dz}{dt} = v(t), \quad (2)$$

where t, z, v, and u respectively represent time, location, velocity and action. Actions can include acceleration, deceleration, braking, and coasting. Other factors that can be considered can include air resistance, track resistance, track slope, motor efficiency, brake efficiency, and the like.

A vehicle rate of energy consumption E is $$E = \int_0^T p[z(t), v(t), u(t)]\,dt, \quad (3)$$

where T is the travel time. The power consumption rate p at time t depends on corresponding vehicle location, speed, and action. The function p returns the rate of energy consumption integrated over the travel time, which is related to state of the vehicle, and action. For a complicate statement of the energy consumption rate, it is better to express the rate as a function of p with all factors as inputs. Under other assumption, p can have different forms, but the function form is more general.

Run-curve optimization is a minimization problem that uses an objective function $$J=\mu E+(1-\mu)T \quad (4)$$

subject to the constraints in equations (1-3), where a weight $\mu$ describes a relative importance of minimizing the travel time with respect the rate of energy consumption.

A number of prior art methods for solving the minimization optimization problem are known, such as dynamic programming, heuristic optimization, genetic algorithms, and nonlinear optimization. However, those methods can be sub-optimal or computationally complex precluding real-time solutions.

SUMMARY OF THE INVENTION

A method for determining an optimal run-curve for a vehicle along a route between two locations while minimizing consumption of energy subject to travel time and speed limits constraints. As an advantage, an optimal run-curve is dynamically determined in real-time, making onboard computation possible.

A prior art search for the optimal weight $\mu$ can potentially require solving the optimization problem $J=\mu E+(1-\mu)T$ repeatedly. For each single weight, speed limits need to be determined. Therefore, the above optimization might not be feasible for a real-time solution. Furthermore, changes on speed limits change the relation between the travel time and the weight, which means that directly using a predetermined relation, as in prior art, is problematic.

It is an object of the invention to reduce the computational complexity required to solve the above optimization problem once, so that the method can be used in real-time using an onboard processor and dynamic applications.

To solve this problem, a transition matrix for an approximate dynamic programming procedure is updated in real-time with current travel times and weights.

DESCRIPTION OF THE PREFERRED EMBODIMENTS OF THE INVENTION

The embodiments of the invention, provide a method for determining an optimal run-curve for a vehicle 101 traveling along a route 102 from A to B subject to travel time 102 and speed limits 103 constraints, while minimizing energy consumption. In the preferred embodiments, the vehicle is a train and the optimization is performed in real-time onboard the train with perhaps limited computational and communication resources.

The embodiments transfer most of the computational complexity, e.g., time to solve the optimization problem and memory requirements, to off-line preprocessing. Therefore, the method reduces the computational complexity of solving the optimization problem, and searching for the optimal weight $\mu$ that minimizes the travel time with respect to the rate of energy consumption by the vehicle in real-time. As speed limits changes, a transition matrix is updated to generate feasible operation under changed conditions, and the relation the current travel times and weights. The transition matrix stores the probabilities of transition from a current velocity and location to a next velocity and location.

It is noted, that variables such as travel times and weights determined and stored during previous trips can also be considered because they do not need to be determined again in real-time during the next trip. It is also noted that the run-curve can be determined multiple times en route.

Figure 1:
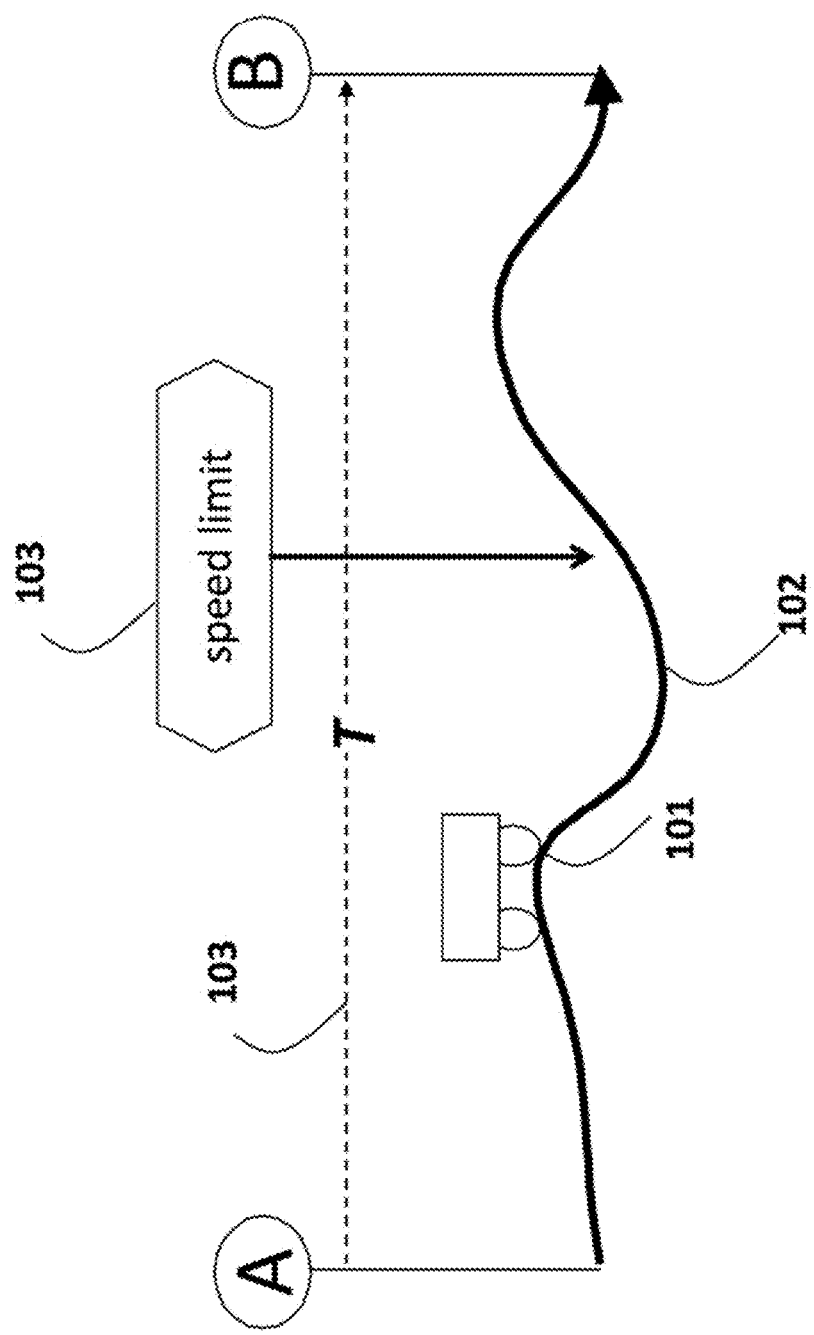
FIG. 1 is a schematic of a vehicle traveling along a route between two locations according to embodiments of the invention.
Figure 2:
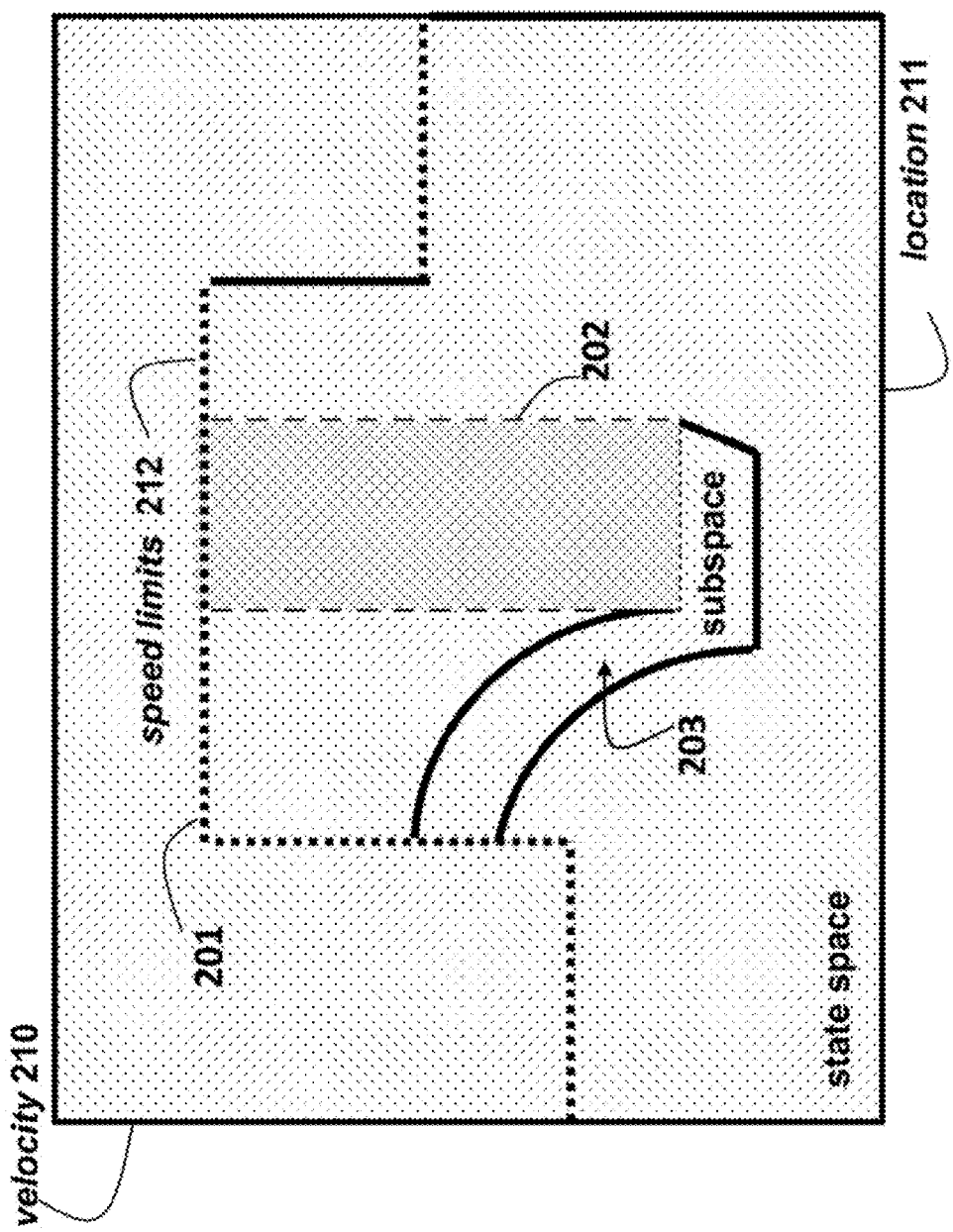
FIG. 2 is a schematic of a state space and a subspace constrained by speed limits according to embodiments of the invention.

FIG. 2 shows a state space for the vehicle as a function of possible velocities 210 and locations 211 along the route. The state space can be continuous, or converted by applying Delaunay triangulation to a discretized state space. Each point in the state space is associated with a possible velocity at a possible location. The state space can be used to generate a transition matrix during preprocessing. The transition matrix can be updated in real-time according to current speed limits. The state space is used for evaluating a set of weights and corresponding travel times during real-time processing.

In real-time, a subspace 203 is defined in the state space. The run-curve 201 shows an original speed limit constrain. The run-curve 202 shows additional dynamic speed limit constraints 212 on the velocities 210. Therefore, only the states in the subspace 203 need to be re-evaluated, and the transition matrix is updated accordingly. This is a substantially smaller task than recomputing the entire state space and transition matrix.

Figure 3A:
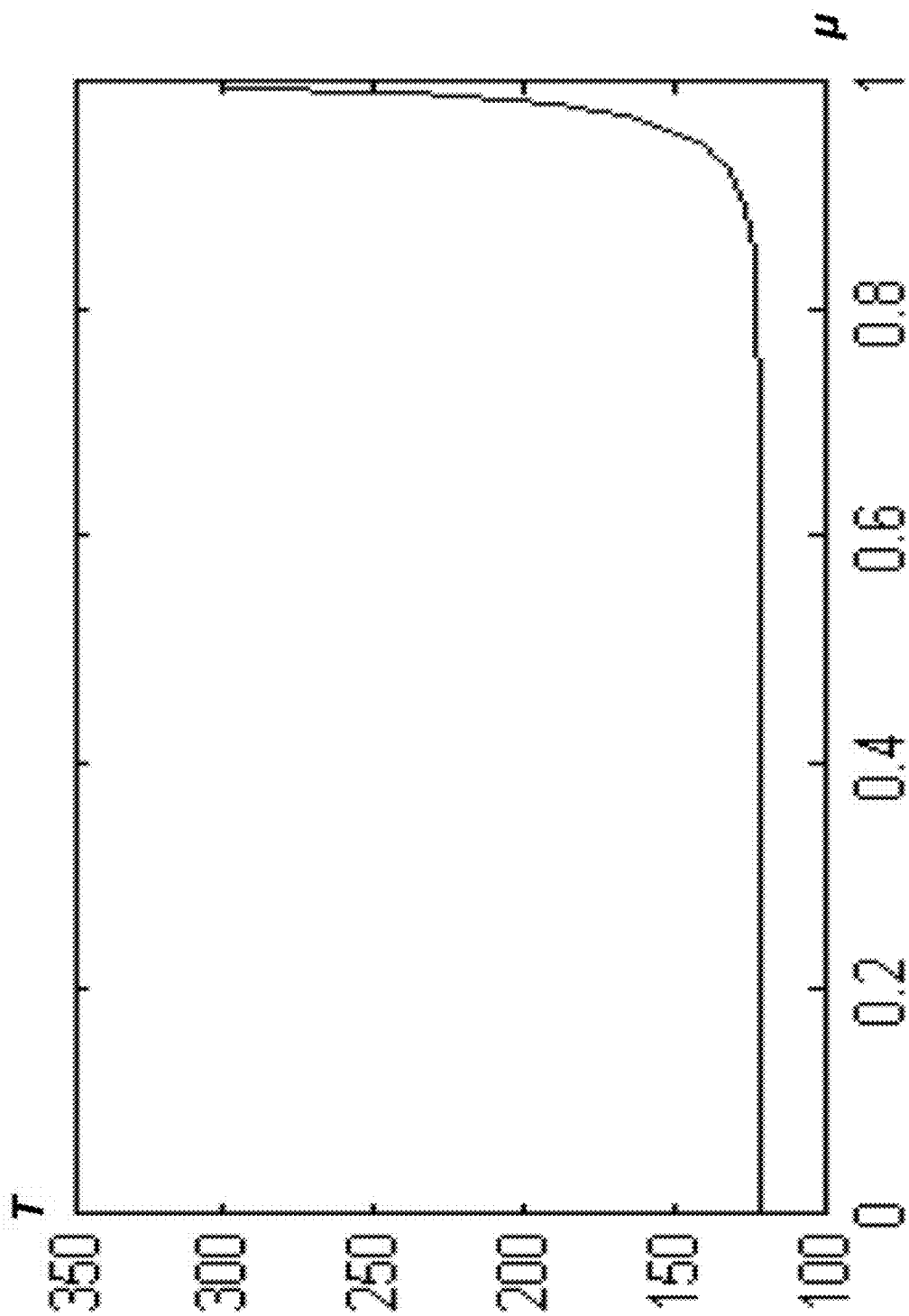
FIG. 3A is a graph of weights as a function of travel time according to embodiments of the invention.

FIG. 3A shows a monotonic relation between travel time T (in seconds) and weights $\mu$ (0.0 to 1.0) in an example "T-$\mu$ chart."

Figure 3B:
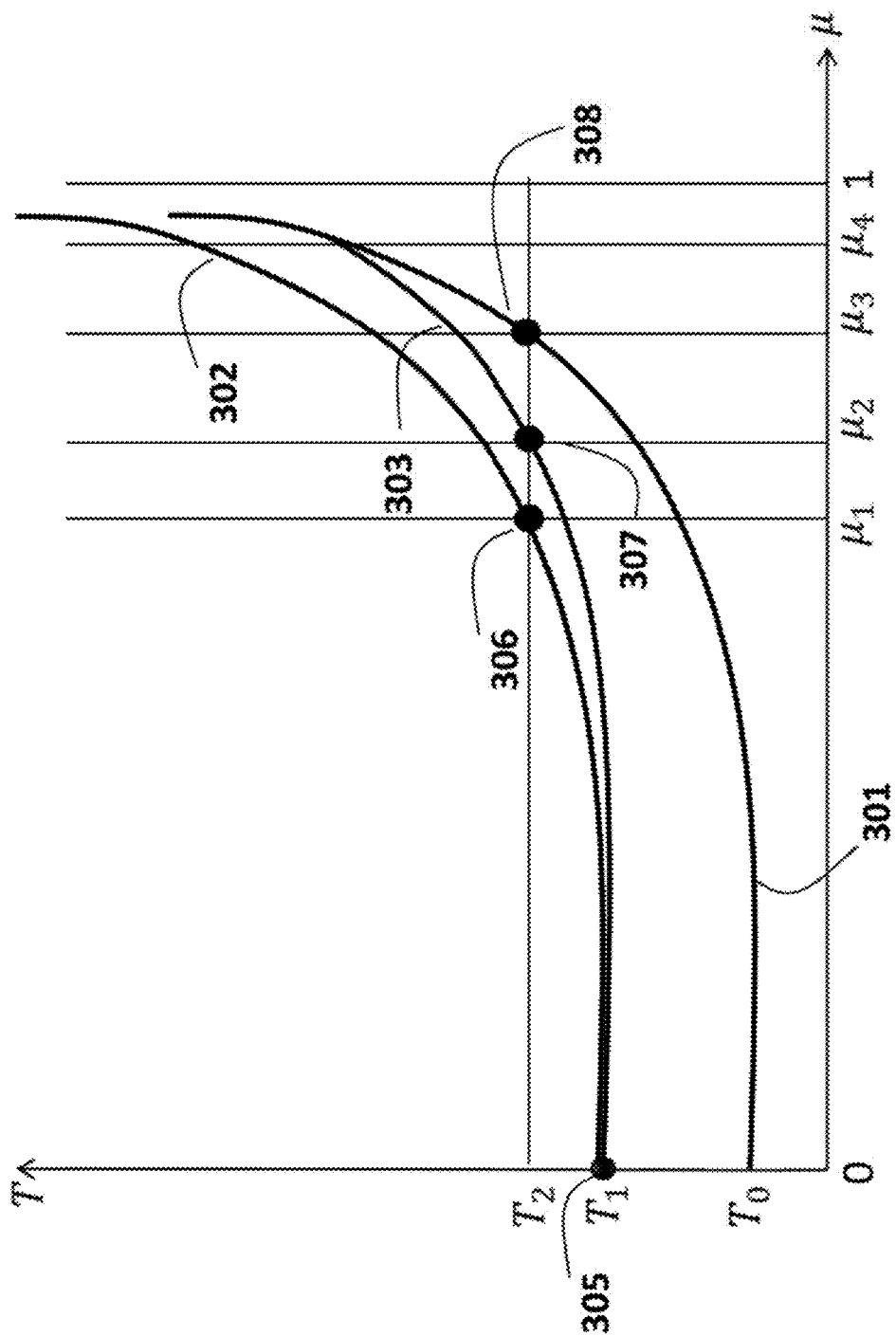
FIG. 3B is a graph a geometric relation between the travel times and weights for various run-curves according to embodiments of the invention.

FIG. 3B shows a geometric relation between the travel times and weights for original T-$\mu$ relation and T-$\mu$ relation under updated speed limits. The original T-$\mu$ relation is shown as a curve 301, where the shortest travel time is $T_0$. Point 305 is the fastest run-curve point under the updated speed limits and the shortest travel time is $T_1$. Run-curve 302 is vertically displaced from run-curve 301 by $T_1-T_0$. Curve 303 corresponds to the relation $T=f(\mu)$ with updated speed limits, where $T_2$ is the travel time. Point 307 is determined from points 305, 306 and 308 as described below.

Optimization Method

Figure 4:
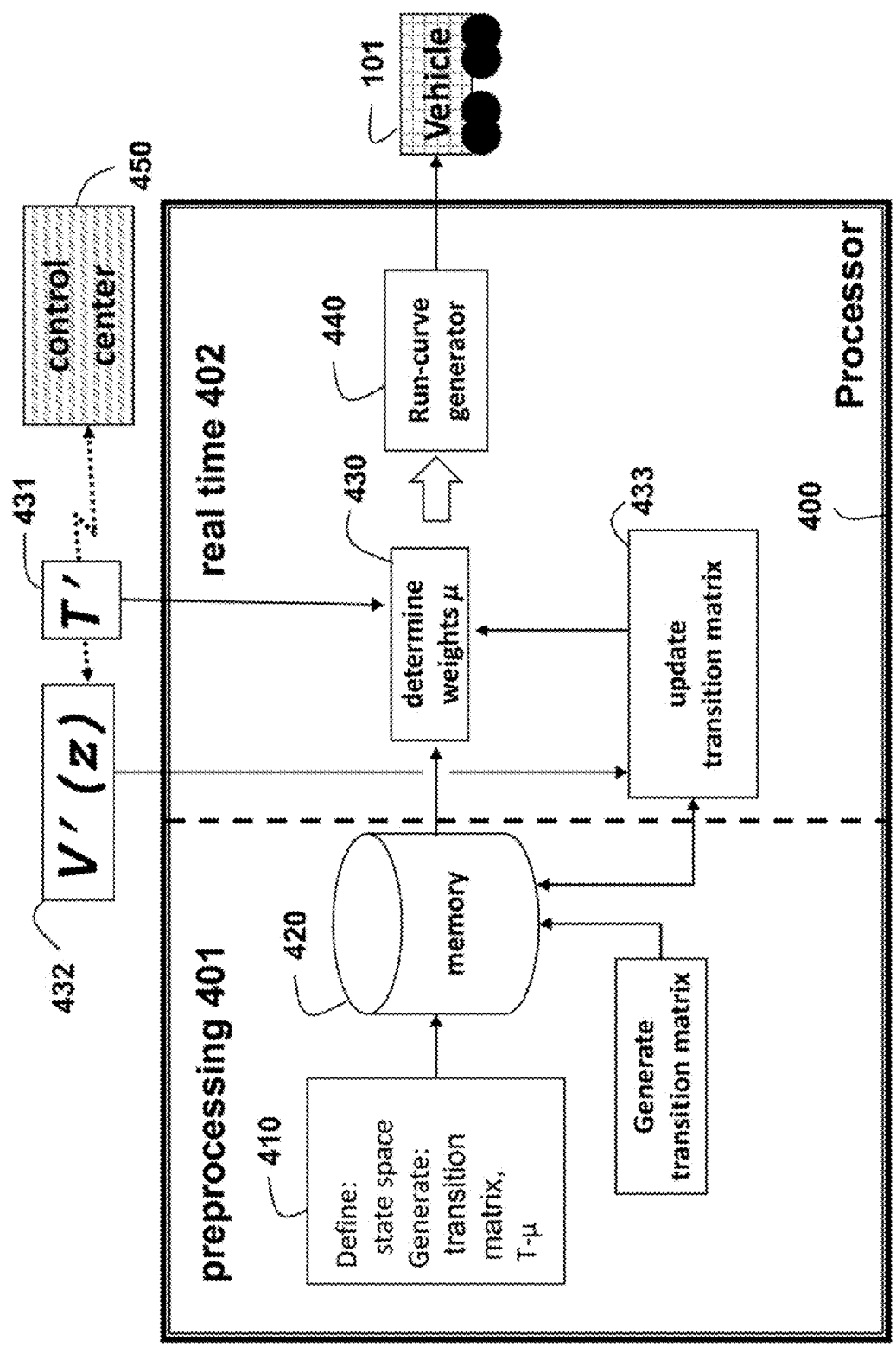
FIG. 4 is a flow diagram of a method and system for determining an optimal run-curve for a vehicle according to embodiments of the invention.

FIG. 4 shows our method for obtain 440 an optimal run-curve for the vehicle 101 traveling along the route 102. The method includes off-line preprocessing 401, and real-time dynamic processing 402, preferably onboard the vehicle. The steps of the method can be performed in a processor 400 connected to memory and input/output interfaces as known in the art. The processor and memory can be located onboard the vehicle 101. The train can communicate with a control center 450 to receive real-time updates on travel times 431 and speed limits 432, and perhaps a current state of the railway system.

Preprocessing

During the preprocessing 401 in step 410, the state space is defined for possible vehicle velocities and locations, and the transition matrix is generated from the state space. As noted above, there can be one transition matrix for each action u. A set of weights $\mu$ and corresponding travel times are also generated. The state space, transition matrix, and the set of T and $\mu$ values can be stored in a memory 420 for later use. Preferably, the memory is onboard the vehicle and connected to the processor. This way weights for a specific travel, time can be determined in real-time by accessing the memory. The preprocessing is required only once, or when the overall railways system changes.

Real-Time Processing

During the real-time processing, perhaps as the vehicle departs location A or anywhere en route, a current travel time F 431 and the current speed limits V'(Z) 432 are received onboard the vehicle, e.g., from the control center 450 based on current conditions in the railway system.

The speed limits identify the subspace 203 of interest in the state space. The transition matrix is updated 433 by updating weights and transition probabilities of the subspace.

After updating the transition matrix, the method 400 determines 430 the weights 410 as follows and shown in FIG. 3B. The run-curve 306 with updated speed limits is determined for the shortest travel time $T_1$. Initial weights $\mu_1$ 306 and $\mu_3$ 308 are determined from the weights stored in the memory 420 using travel time functions $$\mu_1 = f^{-1}(T_2-(T_1-T_0)), \mu_3 = f^{-1}(T_2).$$

The key here is there are multiple initial weights. These weights can be determined by interpolation of the monotonic T-$\mu$ relationship, see FIG. 3A. It is best to use as many weights as possible for accuracy because the memory requirement for storing the T-$\mu$ relation is relatively, while a real-time computation would increase the complexity. In addition, the weight can be reused for later trips by the vehicle on the same route.

Then, the optimal weight $\mu$ is determined, and the run-curve can be generated 440 for the vehicle 101 by solving the minimization problem.

Note, in contrast with the prior art, the minimization problem is solved less times to obtain the optimal run-curve. The solving can use dynamic programming.

During preprocessing and real-time processing, the optimization problem minimizes the objective function (4) subject to the constraints (1-3). The problem can be solved using, for example, an approximate dynamic programming method using equal distance discretization, see the related application.

During the real-time processing, the weight is interpolated from the different weights stored in the memory and then updated by an additional searching process after interpolation, see FIG. 3B. In this interpolation and searching process, a series of different weights u are generated and evaluated sequentially for corresponding travel time until tolerance is achieved. The final weight p obtained in this interpolation and searching process has the corresponding run-curve as the solution the problem.

By updating only the subspace, the computational complexity, particularly the updating of the transition matrix, is dramatically reduced. By using the relation with the initial speed limit and the fastest run-curve after updating the speed limits, the initial weights $\mu_0$ 0 305, $\mu_1$ 306 and $\mu_3$ 308 define a relatively small subspace containing the optimal weight $\mu_2$ 307.

While generating the weights, other reusable values of the optimization problem can also be stored in the memory. For example, the state transition matrix, is determined and when dynamic programming is used to solve the optimization problems for the different travel times T and weights,

EFFECT OF THE INVENTION

The embodiments of the invention provide a method for determining an optimal run-curve for a vehicle along a route between two locations with the following advantages.

The method is well suited for automatic optimal run-curve generation in a dynamic environment where the travel time and the speed limits are subject to frequent changes.

The computational complexity of generating run-curves with changing speed limits and the search for appropriate weights are reduced dramatically. By performing off-line preprocessing, a significant reduction in computational complexity is achieved during the real-time processing, when the desired travel time is only available in real-time.

The state transition matrix reduces the computational complexity by about 85%, compared with recomputing the transition matrix in an approximate dynamic programming approach.

Hence, the method can be performed onboard a train, with perhaps, limited computational and communication resources. Additionally, by reducing the searching effort for the weights, our method can further reduce the computational complexity by about 50%. As another reduction of the computational complexity, the fastest run-curve is executed only once after it is generated, while the weight is updated as vehicle travels along the route. As soon as a new run-curve is generated, the vehicle immediately follows the new run-curve, which further reduces the time to search by about 85%, while the energy cost is within 1% to optimal energy consumption. In term of determination the travel time for the vehicle to react to changing travel times and speed limits, generating an updated transition matrix and getting the eight to converge can reduce the computational complexity by up to 70%.

The faster optimal run-curve determination improves the vehicle ability to respond to changing travel times and speed limits before, during and after departure.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an optimal run-curve for a vehicle along a route between two locations comprising preprocessing steps and real-time processing steps,
   wherein the preprocessing steps comprise:
   defining, for the vehicle, a state space based on possible velocities and possible locations along the route;
   generating, from the state space, a transition matrix for possible actions of the vehicle, and for evaluating a set of weights and corresponding travel times, wherein each weight is a relative importance of minimizing the corresponding travel time with respect to a rate of energy consumption E by the vehicle; and
   wherein the real-time processing steps comprise:
   receiving a current travel time T and current speed limits;
   identifying a subspace of the state space based on the current: speed limits while considering dynamics of the vehicle;
   updating the transition matrix for the subspace according to the current speed limits;
   determining initial weights for solving a minimization problem using the set of weights and the current travel time;
   determining an optimal weight $\mu$ by solving the minimization problem with the initial weights; and
   solving the minimization problem sequentially with different weights to obtain the optimal run-curve, wherein the minimization problem uses an objective function $\mu E + (1-\mu)T$ subject to constraints, wherein the steps are performed in a processor.

2. The method of claim 1, wherein, the processor is onboard the vehicle and the optimal run-curve is determined in real-time.

3. The method of claim 1, wherein a relation between the travel times and the weights is monotonic, wherein the weights are in a range 0.0 to 1.0.

4. The method of claim 1, wherein the real-time processing is performed after receiving the current travel time and the current speed limits while the vehicle is along the route.

5. The method of claim 1, wherein the initial weights are determined during the preprocessing.

6. The method of claim 1, wherein the optimal run-curve is determine repeatedly while the vehicle is along the route.

7. The method of claim 1, wherein the possible actions include acceleration, deceleration, braking, and coasting.

8. The method of claim 1, wherein the dynamics include time, location, velocity and action.

9. The method of claim 1, wherein the constraints include the dynamics of the vehicle and the rate of energy consumption.

10. The method of claim 1, wherein the vehicle is a train.

* * * * *